(12) United States Patent
Krzyak et al.

(10) Patent No.: US 8,784,933 B2
(45) Date of Patent: Jul. 22, 2014

(54) DEVICE HAVING REDUCED FRICTION PROPERTIES

(71) Applicant: Schott AG, Mainz (DE)

(72) Inventors: Marta Krzyak, Bad Gandersheim (DE); Marten Walther, Alfeld (DE); Peter Kracht, Holzminden (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/777,467

(22) Filed: Feb. 26, 2013

(65) Prior Publication Data

US 2013/0171344 A1    Jul. 4, 2013

Related U.S. Application Data

(60) Division of application No. 13/453,616, filed on Apr. 23, 2012, and a continuation of application No. PCT/EP2010/006397, filed on Oct. 20, 2010.

(30) Foreign Application Priority Data

Oct. 23, 2009  (DE) .................. 10 2009 050 568

(51) Int. Cl.
| | |
|---|---|
| B05D 5/06 | (2006.01) |
| B05D 5/08 | (2006.01) |
| C03C 17/34 | (2006.01) |
| C23C 18/12 | (2006.01) |
| F21V 3/04 | (2006.01) |
| C03C 17/42 | (2006.01) |
| G02B 1/11 | (2006.01) |

(52) U.S. Cl.
CPC .......... *G02B 1/115* (2013.01); *C03C 2217/425* (2013.01); *C03C 2218/365* (2013.01); *C03C 17/3417* (2013.01); *C23C 18/1254* (2013.01); *C03C 2217/76* (2013.01); *C23C 18/1225* (2013.01); *F21V 3/04* (2013.01); *C03C 2217/734* (2013.01); *C03C 17/42* (2013.01); *C23C 18/1216* (2013.01)
USPC .......................................... 427/162; 427/164

(58) Field of Classification Search
USPC ................................................... 427/140, 142
See application file for complete search history.

(56) References Cited

U.S. PATENT DOCUMENTS

| | | | |
|---|---|---|---|
| 6,472,017 B2 | 10/2002 | Veerasamy et al. | |
| 6,498,603 B1 * | 12/2002 | Wallace ...................... | 345/177 |

(Continued)

FOREIGN PATENT DOCUMENTS

| | | |
|---|---|---|
| DE | 39 41 797 A1 | 6/1991 |
| DE | 198 48 591 A1 | 10/1999 |

(Continued)

OTHER PUBLICATIONS

International Examination Report dated Feb. 21, 2012 for International Application No. PCT/EP2010/006397 (13 pages).

(Continued)

*Primary Examiner* — Dah-Wei D Yuan
*Assistant Examiner* — Nga Leung V Law
(74) *Attorney, Agent, or Firm* — Taylor IP, P.C.

(57) ABSTRACT

A device, in particular a cover panel for a display device or a monitor auxiliary panel or a surface for input devices, includes a substrate and a coating applied onto the substrate. The coating has a surface having a coefficient of friction in the range between approximately 0.01 and 0.12, in particular between approximately 0.02 and 0.1, or between approximately 0.03 and 0.09.

17 Claims, 2 Drawing Sheets

(56) References Cited

U.S. PATENT DOCUMENTS

| | | | |
|---|---|---|---|
| 7,144,598 B2 * | 12/2006 | Moravec et al. | 427/164 |
| 2008/0003373 A1 * | 1/2008 | Yan et al. | 427/444 |

FOREIGN PATENT DOCUMENTS

| | | |
|---|---|---|
| DE | 102 13 036 A1 | 10/2003 |
| DE | 10 2007 058 927 A1 | 6/2009 |
| EP | 1 816 232 A1 | 1/2007 |
| EP | 1816232 A1 * | 8/2007 |

OTHER PUBLICATIONS

Translation of International Preliminary Report on Patentability for International Application No. PCT/EP2010/006397 (5 pages).

G. Blasek: "VIP Tagungsbericht (13. Neues Dresdner Vakuumtechnisches Kolloquium am Oct. 13 und 14, 2005)—Modifizierung und Beschichtung von Kunststoffoberflachen", Vakuum in Forschung und Praxis, Bd. 18, Nr. 1, Feb. 1, 2006, Seiten 42-45, XP55000078, ISSN: 0947-076X, DOI: 10.1002/vipr.20069005 (4 pages).

Werner M et al.: "Nanotechnologien im Automobil. Innovationspotenziale in Hessen fur die Automobil- und Zuliefer-Industrie", Dec. 1, 2006, Seiten 1-52, XP007918672 (52 pages).

COTEC GmbH: "Nanotechnologie fur absolut hochwertige Oberflachen", Easy-To-Clean Duralon Ultratech, COTEC GmbH Technical Alterations Reserved, May 18, 2011, Seiten 1-2, XP007918663 [gefunden am May 18, 2011] (2 pages).

* cited by examiner

DEVICE HAVING REDUCED FRICTION PROPERTIES

CROSS REFERENCE TO RELATED APPLICATIONS

This is a division of U.S. patent application Ser. No. 13/453,616, entitled "DEVICE HAVING REDUCED FRICTION PROPERTIES", filed on Apr. 23, 2012, which is incorporated herein by reference. U.S. patent application Ser. No. 13/453,616 is a continuation of PCT application No. PCT/EP2010/006397, entitled "DEVICE HAVING REDUCED FRICTION PROPERTIES", filed Oct. 20, 2010, which is incorporated herein by reference.

BACKGROUND OF THE INVENTION

1. Field of the Invention

The present invention relates to a device, in particular to a cover panel for a display device or a monitor front panel or a surface for inputs including a substrate and a coating applied onto the substrate, use of such a device, as well as a method to produce such a device.

2. Description of the Related Art

From DE 198 48 591 A1 an optical glass panel has become known which is provided with a fluoro-organic compound. According to DE 198 48 591 A1, through the coating with a fluoro-organic compound, glass panels, in particular wind shields, window panes or headlight lenses of vehicles are provided which distinguish themselves through high scratch resistance, reduced air friction, improved sliding of windshield wipers as well as dirt repellence. DE 198 48 591 A1 is restricted to the field of conventional glass panels. In particular the importance of avoiding fingerprints in the field of display panels is not described.

A special coating system for a substrate has become known from U.S. Pat. No. 6,472,017 B2 which includes a diamond-like carbon layer and one layer of fluoro-alkyl-silane. The diamond-like carbon layer provides durability and/or hydrophobicity. The fluoro-alkyl-silane layer also serves to provide a high contact angle of the coating system. U.S. Pat. No. 6,472,017 B2 also does not describe avoidance of finger prints.

From DE 10 2007 058 927 A1 a substrate comprising a sol-gel-layer and a barrier layer as well as an anti-reflective layer has become known. The anti-reflective layer can be applied in the sol-gel-process. The coating described in DE 10 2007 058 927 A1 finds use as an abrasion resistant laminate material in the field of solar cells. Coefficients of friction, in particular values of the initial friction, are not described in DE 10 2007 058 927 A1.

From DE 39 41 797 A1 a coating system with a high anti-reflective effect for a substrate has become known, whereby the coating is applied with the assistance of chemical vapor deposition (CVD) or reactive sputtering. Further, DE 102 13 036 A1 describes the coating of a synthetic film with a multi-layer interference coating, whereby the multi-layer interference coating can also find use for an anti-reflection system. Neither in DE 39 41 797 A1 nor in DE 102 13 036A1 are coefficients of friction stated for the coating systems.

Coated substrates, according to those described above often have the problem that the surfaces of these coatings are often very rough in spite of high contact angles. This results in that glass panels, which for example find use in the field of displays, are scratched by ball pens or pens which leads to an unsteady character image and in addition affects the surface. Especially in the use of glass panels in display products which include a touch-panel application, namely a surface whereby through touching of certain areas of the surface the program sequence of a technical device can be directly controlled, the top (glass) surface and its properties is important. However, due to the previously cited problems according to the current state of the art the top glass surface was not able to recognize writing with certainty.

Moreover, the glass surfaces according to the current state of the art were susceptible to contamination for example through finger prints. Therefore, according to the current state of the art, cleaning solutions containing professional and commercial glass cleaning agents had to be used to clean the glass surfaces.

What is needed in the art is a device which can be used for example for touch-panel applications which is dirt repellent and scratch resistant. Fingerprints in particular should be avoided as far as possible on the surface, or should be visible as little as possible.

SUMMARY OF THE INVENTION

The present invention provides a device including a substrate, as well as a coating applied onto the substrate, wherein the coating on the surface exhibits a coefficient of friction (tan a) in the range between approximately 0.01 and 0.12, for example between 0.02 and 0.1, or between 0.03 and 0.09. The coefficient of friction is a coefficient of friction which is determined on a slanted plane which is tilted at an angle $\alpha$. Angle $\alpha$ at which a weight arranged on the plane will slide determines the coefficient of friction. The coefficient of friction according to the current invention is a coefficient of friction of rest or static friction or a starting coefficient of friction, in contrast to the coefficient of sliding friction or dynamic coefficient of friction.

The inventive coating ensures that the surface appears smooth, or respectively is smoothed, and that the coefficient of friction of the surface of the substrate is reduced.

If a surface is provided with a coating according to the present invention, then it is, for example, possible to move an input device on this surface without "scratching" or undesirable "sticking", as is typically the case, for example, with a pen having a synthetic tip or a finger on normal glass surfaces. Moreover, the adherence of dirt or fingerprints on the surface is substantially reduced, so that dry cleaning of these contaminants on a surface with reduced adhesion is possible. This is especially advantageous with touch-panel applications.

In addition, the adherence, or respectively sticking of organic substances, for example oils, such as skin oil, is substantially reduced or respectively practically completely prevented on a substrate provided with the inventive coating, so that fingerprints are largely avoided or respectively are far less visible. Since the skin oil adheres less or practically not at all on the coating, cleaning of the substrate with an inventive coating is also easier. In one embodiment of the present invention the contaminations from organic substances or respectively skin oil can even be wiped off dry. This means that, for example on displays or touch screen panels, the obligatory cleaning agents for organic contaminants can be relinquished.

According to an embodiment of the present invention the coating includes an anti-reflective coating. The coating including the anti-reflective coating or respectively the anti-reflection coating has, for example, a coefficient of friction (tan a) or respectively a static coefficient of friction on the surface in the range of between approximately 0.01 and 0.12, for example between 0.02 and 0.1, or between 0.03 and 0.09. As a rule this is achieved by a cover layer applied on the anti-reflective or respectively anti-reflection coating. The thickness of the cover layer which reduces the coefficient of friction is in the range of between 0.1 nanometers (nm) to 10 nm.

The substrate is, for example, a glass panel, such as a soda-lime glass panel or a borosilicate glass panel which is obtained, for example in a draw method, for example up-draw or down-draw method, or in the float technology or from a cast glass or rolled glass. In particular with the latter method, namely the cast or roll method it is feasible that the necessary optical quality of the surface may be obtained through a polishing method which is required, for example, for a display front panel. The substrate may alternatively also be a synthetic substrate.

For application in display glasses, such as touch-panels or touch screens of small formats the substrate is, for example ≤1 mm thick and is an ultra-thin substrate. Exemplary materials are the ultra-thin glasses D263, B270 or Borofloat by SCHOTT AG.

If the devices are used for cover panels for displays, optionally also as touch-panels or touch screens, for larger surfaces, for example surfaces larger than 1 square meter (m$^2$), then substrates having a thickness of between approximately 4 to 6 millimeters (mm) are used, so that a mechanical protective function of the displays is also assumed.

The panels can be single panels as well as laminated panels. A laminated panel for example includes two panels, a first and a second panel, which are laminated for example with a polyvinyl butyral (PVB) film. Of the outward facing surfaces of the laminated panel at least one surface is provided with an inventive, friction reduced surface having a coefficient of friction or respectively a static coefficient of friction (tan α), in the range of between approximately 0.01 and 0.12, for example between 0.02 and 0.1 or between 0.03 and 0.09.

In order to provide not only extreme smoothness of the surface, but also a surface which can be easily cleaned with liquid cleaning agents, the inventive layers have contact angles >approximately 50 degrees, for example >70 degrees. Layers having contact angles >50 degrees, for example >70 degrees allow, in addition to the previously described dry cleaning, simple cleaning of the glass surface from contaminants using liquid cleaning agents such as glass cleaners or water. The reduced adherence mechanism which, for example is distinguished by a low coefficient of friction, is substantially responsible for the good cleanability, in particular dry cleaning of the inventive layers or respectively coatings. The inventive layer or respectively coating however, also has a high contact angle which can even reach more than 100°; however decisive for the dry-cleanability is the low adherence of contaminants, such as organic contaminants on the surface of the coating, and not the high angle of contact. Accordingly, an "ultra-hydrophobic" coating according to the present application is a coating or a layer having a contact angle which is more than 100°.

The primary application for the herein described devices with a substrate and a coating applied thereto, having a low coefficient of friction is in the use of a cover panel providing a mechanical protective function and/or a surface for inputs, for example input devices or so-called displays. The device finds use in areas where technical devices can be operated by touching of parts on the surface of the device, namely in the area of touch-panel applications with interactive input. Since a panel of this type also introduces additional interfaces into the total optical system of the display, a reflectivity of approximately 8% is achieved on the display when using only a conventional float glass panel as substrate material without anti-reflective coating. This reflectivity interferes with the effective contrast of the display since reflections compete with the useful signal of the display. For this reason, it is especially advantageous for this application to incorporate an anti-reflective coating or respectively an anti-reflection coating onto the substrate, namely to use a panel provided with an anti-reflective coating, whose reflectivity $R_{VIS}$ clearly reduces in the visible wavelength range at standard light D65 and is, for example lower than approximately 4%, or <2%. This glass or synthetic panel then includes an anti-reflective coating which is also referred to as anti-reflection coating and which is applied according to one of the following application methods:

a) The anti-reflective coating or respectively the anti-reflection coating is applied with the assistance of liquid technology, whereby the coating applied with the assistance of the liquid technology is provided with the assistance of one of the following techniques:
   The anti-reflective coating is applied using the sol-gel technology;
   The anti-reflective coating is produced as single-layer interference coating in the sol-gel-technology;
   The anti-reflective coating is produced as multi-layer interference coating in the sol-gel technology, wherein the multi-layer interference coating is, for example, a three- to seven-layer interference coating; or
   The anti-reflective coating is produced as a three-layer interference coating in the sol-gel technology, whereby the first layer has a refractive index between approximately 1.6 and 1.8, the second layer has a refractive index between approximately 1.9 and 2.5 and the third layer has a refractive index between approximately 1.4 and 1.5.

b) The anti-reflective coating or respectively anti-reflection coating is produced with the assistance of a high-vacuum technology, whereby the coating applied with the assistance of high-vacuum technology is provided in one of the following techniques:
   The anti-reflective coating is produced with the assistance of a high-vacuum technology as a multi-layer interference coating system, wherein the multi-layer interference coating is, for example, a three-layer to seven-layer interference coating;
   The anti-reflective coating is produced with the assistance of a high-vacuum technology as a single layer system;
   The anti-reflective coating is produced in a sputtering process under high vacuum; or
   The anti-reflective coating is produced in a high-vacuum coating process by thermal evaporation;

c) The anti-reflective coating or respectively anti-reflection coating is produced with the assistance of a CVD process, whereby the layer applied with the assistance of a CVD process is provided in one of the following techniques:
   The anti-reflective coating is produced in an online-CVD process; or
   The anti-reflective coating is produced in an offline-CVD process;

d) The anti-reflective coating or respectively anti-reflection coating is produced with the assistance of an etching process, whereby the layer applied with the assistance of an etching process is provided in one of the following techniques:

The anti-reflective coating is produced with the assistance of an etching process as a porous layer; or The anti-reflective coating is produced with the assistance of an etching process as a light-scattering surface.

If an anti-reflective coating is applied, and the anti-reflective coating is provided with a cover layer which has a static coefficient of friction (tan α) in the range between approximately 0.01 and 0.12, for example between 0.02 and 0.1, or between 0.03 and 0.09, then the anti-reflective coating is optically adapted to the cover layer, for example through addition of precursor materials or polymers, so that an anti-reflective effect is provided. The anti-reflective effect is such that, with one- or two-sided application the reflectivity of the entire system is between approximately 0.1% and 7%, for example between 0.1% and 6%, between 0.1% and 5.5%, between 0.1% and 4%, between 0.1% and 2%, or between 0.1% and 1.5% in the visible wavelength range at standard light D65.

According to one embodiment of the present invention, the substrate with coating is used in one of the following areas or for one of the following products:
 a protective cover for displays or respectively display devices;
 a cover panel for displays;
 a cover panel for touch panels,
 a part of the touchscreen with optical scanning; or
 within a display system as a touchpad for interactive input of signals, or as cover or protective panel.

In addition to the device, the present invention also provides a method to produce a coating having a coefficient of friction between approximately 0.01 and 0.12, for example between 0.02 and 0.1, or between 0.03 and 0.09 on a substrate which, includes the following steps:
 A coating, in particular an anti-reflection coating is applied according to a liquid technology, such as with sol-gel technology, or with high-vacuum technology onto a substrate;
 The coated substrate is introduced into a pressure vessel which is evacuated at low vacuum;
 The coating applied onto the substrate is processed in a further step, for example smoothed locally in such a way that the coefficient of friction is between approximately 0.01 and 0.12, for example between 0.02 and 0.1, or between 0.03 and 0.09.

According to a second embodiment of the method according to the present invention:
 The coated substrate is introduced into a pressure vessel which is set to a vacuum in the range of between approximately 10 Pascals (Pa) to 1050 hectopascals (hPa), for example between 10 hPa to 500 hPa, wherein for example a vacuum in the form of a fine vacuum in the range between 10 Pa and 100 Pa or a low vacuum above 100 Pa is evacuated;
 A cover layer is applied onto the coating in such a manner that the coefficient of friction is between approximately 0.01 and 0.12, for example between 0.02 and 0.1, or between 0.03 and 0.09. The coating is hereby for example smoothed, at least locally.

In order to adjust the coefficient of friction the ultra-hydrophobic coating material "Duralon Ultratec" produced by Cotec GmbH., Frankenstraβe 19, D-63791, Karlstein, Germany can for example, in the form of a tablet (14 mm diameter, 5 mm height) be put into a vaporizer which is located in the aforementioned pressure vessel. From this vaporizer the coating material is then evaporated from the filling of the tablet at temperatures of between approximately 100° C. to 400° C. and precipitates onto the surface of the substrate or onto a previously applied coating, for example onto an anti-reflection coating or respectively anti-reflex coating as a cover layer. For distribution of the coating material a device for general coating of objects is used, as disclosed in EP-A-1816232, the disclosure content of which is incorporated into the current application in its entirety. The time- and temperature profiles are set as provided by Cotec GmbH, Frankenstraβe 19, D-63791, Karlstein, Germany for evaporation of the "Duralon Ultratec" material tablet. The substrates (non-coated and/or with anti-reflection coating) reach a slightly elevated temperature during the process which is in the range of between approximately 300K to 370K.

The previously described application method normally delivers cover layers which are only a few nm thick, generally less than approximately 10 nm thick and, for example, represent only a monomolecular saturation of the surface of the coating or respectively the substrate. If cover layers are applied onto anti-reflective coatings or respectively anti-reflection coatings, the thickness of the coating or the refractive index of the entire system consisting of coating and cover layer changes. In order to continue to receive good anti-reflection, the entire system consisting of anti-reflective coating and cover layer may be adapted. Since the cover layer is very thin, the optical system with an anti-reflection coating only needs to be adjusted slightly with such thin cover layers, in order to achieve the desired tint of the residual reflection of the anti-reflection coating, for example by altering the layer structure. It is known to the expert how admixtures can be added to the process described above which effect for example a layer thickness of higher than approximately 10 nm for the anti-reflection coating. An example which can be mentioned is, that simultaneously with the evaporation of the layer having low static friction, an additional polymer compound which leaves behind a transparent layer may be evaporated. The material to reduce the static friction is then incorporated into this layer and can achieve clear optic effect as a layer of more than approximately 10 nm.

In this case the uppermost cover layer including for example, a material having a low coefficient of friction, as well as the last layer adjacent to the cover layer of the anti-reflection system including low refractive material having a refractive index between approximately 1.37 and 1.6 should be considered as a single layer, which is calculated together into the configuration of the anti-reflection system. As admixtures for the cover layer, diverse materials in addition to the aforementioned polymers can be used as precursors for known CVD processes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION OF THE INVENTION

Figure 1:
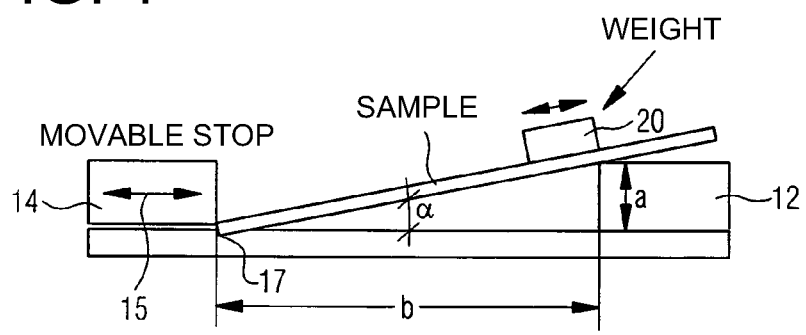
FIG. 1 illustrates the principle of measurement to determine the coefficient of friction.

Referring now to the drawings, and more particularly to FIG. 1, there is shown the principle of measurement for the coefficient of friction as is the basis for the current invention and as stated in table 1 for various samples. A glass panel to be tested, provided with a coating is brought into a defined slanted position and is moved through movable stop 14 over the edge of block 12, having a height a in direction 15 so that the angle of the slant, angle α becomes increasingly larger. When moving stop 14, distance b between support point 17 and block 12 changes, thereby changing angle α. The height of block 14 is 15 mm. The following equation applies to angle α:

$$\tan(\alpha)=a/b$$

Weight 20 resting on the pane starts to slide with increasing angle α. The angle at which weight 20 starts to slide on the glass pane is then the measure for the coefficient of friction according to the present invention. The coefficient of friction according to the present invention is hereby the coefficient of friction of rest, or starting coefficient of friction or a coefficient of static friction. As weight 20 a "Delrin" (POM) cuboid measuring 20×20×10 mm with applied brass piece and a total weight of 106 g is, for example used. Angle α can be determined very simply from distances b and a, as described above. At fixed height a and determination of length b at which the block starts to slide, angle α which is consistent with the coefficient of friction, in this case the coefficient of static friction, can be determined.

Measurements were taken of the following tests and, as shown in table 1, the coefficient of friction and the angle of contact determined for the examples:

EXAMPLE 1

Sample 1: In the trial according to sample 1 the anti-reflection coating was produced according to the sol-gel method. The coating includes three individual layers respectively and possesses the following structure: Substrate+M+T+S.

The individual layer identified with T contains titanium dioxide ($TiO_2$). The individual layer identified with S contains silicon dioxide ($SiO_2$) and the individual layer identified with M is always drawn from S and T mixed solutions. The float glass substrate is carefully cleaned prior to coating. The dipping solutions are respectively applied in rooms which are air-conditioned to approximately 28° C. at a humidity of 5 to 10 grams per kilogram (g/kg), whereby the draw speeds for each individual layer M/T/S are approximately 275/330/228 millimeters per minute (mm/min). Drawing of each gel layer is followed by a curing process in air. The curing temperature and the curing time are approximately 180° C./20 min after production of the first gel layer, as well as approximately 440° C./60 meter (m) after production of the second and third gel layer. In the case of the T-layers the dipping solution (per liter) includes the following: approximately 68 milliliters (ml) titanium-M-butylate, approximately 918 ml ethanol (ABS), approximately 5 ml acetyl acetone and approximately 9 ml ethyl-butyl-acetate.

The dipping solution to produce the S-layer includes: approximately 125 ml silicic acid methyl ester, approximately 400 ml ethanol (ABS), approximately 75 ml $H_2O$ (distilled), approximately 7.5 ml acetic acid and is diluted with approximately 393 ml ethanol (ABS) after a rest period of approximately 12 hours. The coating solutions to produce the oxides with the medium refractive index are prepared by mixing of the S+T solutions. The layer identified with M is drawn from a dipping solution having a silicon dioxide content of approximately 5.5 grams per liter (g/l) and a titanium dioxide content of approximately 2.8 g/l. The applied wet-chemical sol-gel process permits economic dip-coating of large areas.

In addition to the anti-reflection coatings produced with the assistance of the sol-gel method (sample 1), anti-reflection coatings can also be applied with the assistance of sputtering processes. Such a coated system is shown below.

EXAMPLE 2

Sample 2: The example-sample 2 is a one-sided anti-reflection coating which is applied as follows in the sputtering process: The coating is deposited in an inline unit in a mid-frequency (MF) sputtering process through magnetron sputtering, whereby the substrate is positioned on a so-called carrier and is transported on same through the sputtering unit. The application method is as follows:
a) Inside the coating unit the substrate is first "heated to approximately 150° C. for dewatering of the surface". Then an anti-reflection system (for example including four layers) is produced as follows:
b) Sputtering of a high refractive substrate at a feed rate of approximately 1.7 meters per minute (m/min), whereby the carrier oscillates in front of the sputtering source and while the layer of 30 nm thickness is deposited.
   The production of the layer occurs through addition of argon and reactive gas, by regulating the reactive gas to plasma impedance. The process pressure is determined in particular through the amount of argon, which leads to typical process pressures in the range between 1×E-3 and 1×E-4 millibar (mbar). The deposition in the plasma occurs through pulsation.
c) Sputtering of a low refractive layer at a feed rate of approximately 2.14 m/min. A layer having a thickness of approximately 30.5 nm is hereby produced. The layer production occurs according to the deposition described for layer 1.
d) Sputtering of a high refractive layer according to layer 1. Here, a layer having a thickness of approximately 54 nm is produced at a feed rate of approximately 0.9 m/min.
e) Sputtering of a low-refractive layer according to layer 2. A layer having a thickness of approximately 103 nm is produced at a feed rate of approximately 0.65 m/min. Subsequently the coated substrate is transferred out with the carrier through a transfer chamber.
f) To produce the sample the backside of the sample was subsequently also provided with an anti-reflective coating in a second coating passage according to steps a) through d).

In addition layers which are coated according to example sample 1 can be coated with ETC (easy to clean) layers. Such systems are described in sample 3.

EXAMPLE 3

Sample 3:
A layer according to sample 1 is pre-cleaned in a washing machine and pre-treated with a neutralizer so that the coating is fat free. The thus cleaned surface is sprayed with the product ClearShield which is offered commercially for example by Fa. Bohle in Haan (Germany) and which represents a typical fluoro-polymer solution for ETC (Easy To Clean) applications. The surface sprayed with ClearShield is left to react at room temperature for approximately 10 to 15 minutes. The coated surface is then washed and dried. Through the coating with an ETC (easy to clean) ClearShield layer the contact angle can be substantially improved compared to untreated samples, as in sample 1 or 2. However, an increase of the contact angle by 23 or respectively 46 degrees in sample 1 or respectively sample 2 to 78 degrees in sample 3 does not mean that the respective coefficient of friction is achieved and that therefore a finger or pen can glide more easily over the surface or that a dry cleaning is made possible.

In order to achieve this it is necessary according to the present invention to provide a secondary treatment to the layer according to sample 1 or respectively as previously described to apply a cover layer as a smooth layer onto the anti-reflection coating. This is cited in sample 4.

EXAMPLE 4

Sample 4: The coating cited in sample 4 is again a coating in accordance with sample 1 which is subjected to a secondary treatment. In the secondary treatment the coating according to sample 1 is after-treated in a process with vacuum. Here, the coated glasses according to sample 1 are brought into a pressure vessel which is subsequently evacuated with low vacuum.

In order to implement reduction of the coefficient of friction or respectively smoothing of the coating, for example with a cover layer, the ultra-hydrophobic coating material "Duralon Ultratec" produced by Cotec GmbH., Frankenstraße 19, D-63791, Karlstein, Germany for example, in the form of a tablet (14 mm diameter, 5 mm height) be put into a vaporizer which is located in the aforementioned pressure vessel. From this vaporizer the coating material is then evaporated from the filling of the tablet at temperatures of between approximately 100° C. to 400° C. and precipitates onto the surface of the substrate or onto a previously applied coating, for example onto an anti-reflection coating as a cover layer. For distribution of the coating material a device for general coating of objects is used, as disclosed in EP-A-1816232, the disclosure content of which is incorporated into the current application in its entirety. The time- and temperature profiles are set as provided by Cotec GmbH, Frankenstraße 19, D-63791, Karlstein, Germany for evaporation of the "Duralon Ultratec" material tablet. The substrates (non-coated and/or with anti-reflection coating) reach a slightly elevated temperature during the process which is in the range of between approximately 300K to 370K.

As can be seen in table 1, a coefficient of friction or respectively a coefficient of static friction of tan α=0.07, which is in the range of between approximately 0.01 to 0.12, is achieved. As can further be seen in table 2, the angle of contact for sample 4 is high, namely more than 100 degrees. It can further be seen in table 1 that a coefficient of friction or respectively a coefficient of static friction of 0.07, namely of between approximately 0.01 and 0.12 is achieved, whereas the samples which were not treated with an additional cover layer—sample 1 through sample 3—have coefficients of friction or respectively coefficients of static friction of approximately 0.16 through 0.2.

The results of the examination of the coefficients of friction and angles of contact are given in the following tables.

TABLE 1

| | | coefficients of friction for sample examples: Sample 1-Sample 4 | | | | | | | | | | | |
|---|---|---|---|---|---|---|---|---|---|---|---|---|---|
| | | 1 | 2 | 3 | 4 | 5 | 1 | 2 | 3 | 4 | 5 | | |
| Sample | | Distance b/mm | | | | | Coefficient of friction (tan α) | | | | | Mean value | Diffusion |
| Sample 1 | cleaned | 95 | 90 | 90 | 95 | 60 | 0.16 | 0.17 | 0.17 | 0.16 | 0.25 | 0.18 | 0.04 |
| Sample 2 | cleaned | 90 | 80 | 90 | 100 | 90 | 0.17 | 0.19 | 0.17 | 0.15 | 0.17 | 0.17 | 0.01 |
| Sample 3 | cleaned | 100 | 95 | 90 | 90 | 90 | 0.15 | 0.16 | 0.17 | 0.17 | 0.17 | 0.16 | 0.01 |
| Sample 4 | cleaned | 190 | 210 | 260 | 250 | 250 | 0.08 | 0.07 | 0.06 | 0.06 | 0.06 | 0.07 | 0.01 |

The coefficients of friction or respectively the coefficients of static friction were, as described above, determined through determination of tan (α) by moving the glass pane over a block having height a of, for example, approximately 15 mm.

The results concerning the angle of contact are provided in table 2.

TABLE 2

| | Angle of contact [°] | |
|---|---|---|
| Sample | Mean value | Diffusion |
| Sample 1 | 23 | 0.63 |
| Sample 2 | 46 | 1.67 |
| Sample 3 | 78 | 1.02 |
| Sample 4 | 107 | 0.40 |

For the angle of contact measurements samples were cleaned on both sides using ethanol. Then the angle of contact was measured using device PCA 100M/4 by DataPhysics. The method was implemented as a static angle of contact measurement according to the Sessile Drop method with deionized water and a drop volume of 3.5 microliters (μl). 5 measurements were conducted for evaluation purposes and the median value from the 5 measurements was subsequently given as the measured value.

Figure 2A:
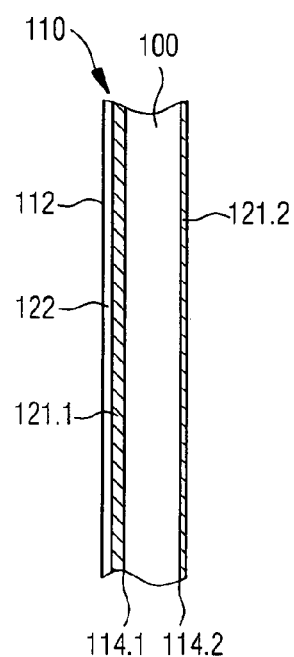
FIGS. 2a-2b illustrate the device according to the present invention, including a single flat panel as the substrate material (FIG. 2a) and a laminated panel (FIG. 2b).
Figure 2B:
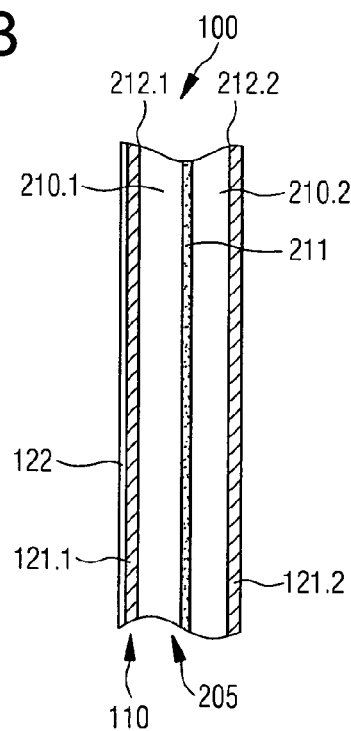

Referring now to FIGS. 2a and 2b, there is shown a layer system according to the invention. The illustrated layer system according to FIG. 2 includes substrate 100 in the form of a single panel as well as coating 110 applied onto one side 114.1, including anti-reflection coating 121.1 onto which in the current example also cover layer 122 is applied as in example 4 (sample 4). Cover layer 122 has a coefficient of friction in the range of between approximately 0.01 to 0.12, for example between approximately 0.02 and 0.1, or between approximately 0.03 and 0.09 on outward facing surface 112. This results in that a finger or pen can glide more easily over the surface of such a sample, which is advantageous in particular in applications in the field of touchscreens or displays.

In particular adherence of organic contaminants, such as skin oil is reduced. Fingerprints on the touchscreen or respectively the display are thereby prevented and related cleaning is facilitated including dry cleaning.

On the other side, namely the opposite side, such as the backside 114.2 of substrate 100, second anti-reflection layer 121.2 may be provided in such a manner that a very low reflectivity of $R_{VIS}$<approximately 4%, for example <2% is achieved. Technically relevant is hereby reflectivity $R_{VIS}$>0.2%. This means that the reflectivity $R_{vis}$ in the visible wavelength range at standard light D65 for the entire system is in the range between approximately 4% and 0.2%, for example between approximately 2% and 0.2%. The anti-reflection coating is often also referred to as anti-reflective coating.

The substrate is, for example, a single glass panel, such as a soda-lime glass panel or a borosilicate glass panel which is obtained, for example, in a draw method, for example an up-draw or down-draw method or in the float technology or from a cast glass or rolled glass. With the latter method, namely the cast or roll method, it is feasible that the necessary optical quality of the surface is obtained through a polishing method which is required, for example, for a display front panel.

As an alternative to the single panel the layer system, as illustrated in FIG. 2b may also include a laminated panel as the substrate. The same components as shown in FIG. 2a are identified with same reference numbers. Substrate 100 includes as laminated panel 205 first panel 2101.1 and second panel 210.2. First and second panel 210.1, 210.2 are laminated to a lamination using film 211, for example a polyvinyl butyral (PVB) film. At least one outward facing surface 212.1 and 212.2 of first panel 210.1 or respectively second panel 210.2 includes cover layer 122 having a low coefficient of friction, namely a low static coefficient of friction. In the current example, coating 110 including first anti-reflection coating 121.1 and cover layer 122 is applied onto surface 212.1 of first panel 210.1. On outside 212.2 of second panel 210.2, second anti-reflection coating 121.2 is also provided in order to achieve very low reflectivity $R_{vis}$ in the entire system. The substrate may alternatively also be a synthetic substrate.

For application in display glasses of a smaller format, the substrate may be ≤approximately 1 mm thick and is, for example an ultra-thin substrate. Examples are the ultra-thin glasses D263, B270 or Borofloat by SCHOTT AG.

If the devices are used for display glasses for larger surfaces, for example surfaces larger than 1 meter squared ($m^2$), then substrates having a thickness of approximately 3 to 6 mm are used.

Through the secondary treatment in a low-/medium high vacuum according to the inventive method as described in example 4 it is possible to produce a substrate having a coefficient of friction in the range of between approximately 0.01 to 0.12. This is advantageous in regard to gliding of fingers or pens over the surface, particularly when using such coated glasses in the area of touchscreens or displays. Such layers having very low coefficients of static friction also have poorer adherence of dirt on the surface, so that contaminations, for example finger prints can be wiped off easily with a dry cloth.

In special arrangements of the method, additional components are to be mounted on the inventive described substrate, which are used typically as display covers. Examples for this are back-mounted support systems, for example of metal or front-mounted optical docking systems. Standard procedure is to mount these elements through adhesion. Since the described layers with low coefficient of friction also have poor adhesion for bonded joints it is advantageous in these cases to exclude the regions which are to be glued together from the described coating process. The relevant region can be masked for this purpose, for example using an adhesion film, or also strippable lacquer in screen printing technology. This masking has the effect that the layer formation toward the surface of the substrate with overlying anti-reflection coating is prevented and the gluing process onto partial regions is implemented, which does not meet the requirement that the coefficient of friction is very low. The masked regions are then, for example, positioned in segments of the substrate which are not visible in its application; this would for example be a housing cover.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method to produce a cover panel for one of a display device, a monitor front panel, and a surface for inputs, the method comprising the steps of:
   providing a substrate;
   applying an anti-reflective coating onto said substrate according to a liquid technology, said anti-reflective coating having three individual layers including a titanium dioxide layer, a silicon dioxide layer and a layer including silicon dioxide and titanium dioxide;
   introducing said substrate coated with said anti-reflective coating into a pressure vessel set to a vacuum in a range of between approximately 10 Pascals (Pa) to 1050 hectopascals (hPa); and
   applying a cover layer onto said anti-reflective coating such that a coefficient of friction is between approximately 0.01 and 0.12.

2. The method according to claim 1, wherein said liquid technology is a sol-gel technology.

3. The method according to claim 2, further comprising the step of applying said anti-reflective coating onto said substrate as a multi-layer interference coating, including between three and seven layers.

4. The method according to claim 3, wherein said multi-layer interference coating is a three layer interference coating including a first layer having a refractive index between 1.6 and 1.8, a second layer having a refractive index between approximately 1.9 and 2.5and a third layer having a refractive index between approximately 1.4 and 1.5.

5. The method according to claim 1, wherein said pressure vessel is set to between approximately 10 hPa to 500 hPa.

6. The method according to claim 1, wherein said vacuum is one of a fine vacuum in a range between approximately 10 Pa and 100 Pa and a low vacuum above 100 Pa, said vacuum being evacuated.

7. The method according to claim 1, wherein said coefficient of friction is between approximately 0.02 and 0.1.

8. The method according to claim 7, wherein said coefficient of friction is between approximately 0.03 and 0.09.

9. The method according to claim 1, further comprising the step of putting an ultra-hydrophobic coating material into a vaporizer located in said pressure vessel and evaporating and subsequently precipitating said ultra-hydrophobic coating material onto a surface of one of said substrate and said coating such that said one of said substrate and said coating has a coefficient of friction between approximately 0.01 and 0.12.

10. The method according to claim 9, wherein said ultra-hydrophobic coating material is precipitated onto said at least one anti-reflective coating in a form of said cover layer.

11. The method according to claim 9, wherein said coefficient of friction is between approximately 0.02 and 0.1.

12. The method according to claim 11, wherein said coefficient of friction is between approximately 0.03 and 0.09.

13. The method according to claim 9, wherein a temperature in said vaporizer is between approximately 100° C. and 400° C.

14. The method according to claim 13, wherein said substrate exhibits a temperature of between approximately 300 K and 370 K.

15. The method according to claim 1, wherein said cover layer has a thickness <approximately 20 nanometers (nm).

16. The method according to claim 15, wherein said thickness of said cover layer is <approximately 10 nm.

17. The method according to claim 16, wherein said thickness of said cover layer is in a range between approximately 0.1 nm to 10 nm.

\* \* \* \* \*

UNITED STATES PATENT AND TRADEMARK OFFICE
CERTIFICATE OF CORRECTION

PATENT NO. : 8,784,933 B2  
APPLICATION NO. : 13/777467  
DATED : July 22, 2014  
INVENTOR(S) : Krzyak et al.

Page 1 of 1

It is certified that error appears in the above-identified patent and that said Letters Patent is hereby corrected as shown below:

In The Specification

COLUMN 2
   At lines 25-26, please delete "(tan a)", and substitute therefore --(tan α)--;

At line 66, please delete "(tan a)", and substitute therefore --(tan α)--.

In The Claims

COLUMN 12
   At line 48, please delete "2.5and", and substitute therefore --2.5 and--.

Signed and Sealed this  
Fifth Day of January, 2016

Michelle K. Lee  
*Director of the United States Patent and Trademark Office*